Aug. 7, 1928.                                                1,679,469
J. GEIGER
RAIL VEHICLE
Filed May 21, 1926

A-B

C-D

Josef Geiger
by Maréchal and Noe

Patented Aug. 7, 1928.

1,679,469

UNITED STATES PATENT OFFICE.

JOSEF GEIGER, OF AUGSBURG, GERMANY, ASSIGNOR TO MASCHINENFABRIK AUGSBURG-NUERNBERG, AKTIENGESELLSCHAFT, OF AUGSBURG, GERMANY, A CORPORATION OF GERMANY.

RAIL VEHICLE.

Application filed May 21, 1926, Serial No. 110,637, and in Germany June 2, 1925.

This invention relates to rail vehicles, especially motor vehicles which are operated by combustion engines by means of an intermediate toothed gearing which is resiliently supported by the driving axle. In the known arrangement of this gear transmission the gear wheel, which transmits the power to the driving axle, is mounted rigidly upon the latter. By reason of the gear being resiliently mounted upon the driving axle the vibrations of the latter, which occur during operation, are immediately transmitted by this wheel upon the wheel which is meshing therewith, whereby the proper conditions of mesh are unfavorably influenced. In case of suddenly occurring shocks it may happen that the faces of the teeth which are meshing with each other will be caused to be unfavorably displaced and by this an abnormal wear and eventually also fracture of the teeth may be the result.

The object of this invention therefore is the provision of a novel connection between the gear-wheel and the driving axle, the gear-wheel, which is arranged upon the driving axle, being loosely mounted upon a ball journal and resiliently coupled with the driving axle by means of a properly constructed coupling member. With this construction the axle of the gear may to a certain extent swing in the manner of a pendulum in case of arising shocks and vibrations, while the gear wheel itself will remain in proper mesh with the pinion appertaining thereto. The resilient coupling member will thereby ensure a quiet transmission of power without any shock from the driving motor to the driving axle.

In the drawing an example of a construction according to this invention is shown.

The gear box or frame $a$ is resiliently mounted by the springs $b$ upon the driving axle $c$ and suspended at the point $d$ in proper manner on the frame of the vehicle. The driving axle $c$ is provided with a spherically formed journal $e$, upon which the driving gear $f$ is loosely mounted. Laterally of the latter a disk $g$ is rigidly mounted upon the driving axle, said disk being provided with diametrically opposed recesses $h$. The coupling members or catch pins $i$ are held at one end in the gearwheel $f$ and project into the recesses in the disk $g$, said pins having the form of ordinary bolts and being provided with springs $k$, which press against the walls of the recesses $a$.

Figure 1:
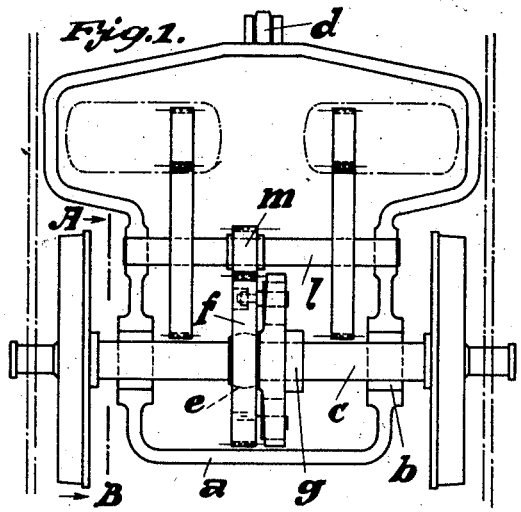
Fig. 1 is a diagrammatic top-view showing the general arrangement of the gearing according to this invention.
Figure 2:
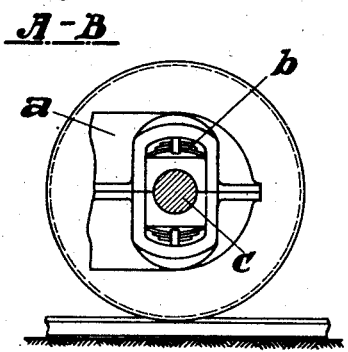
Fig. 2 is a section taken on the line A—B of Fig. 1, which shows the gear box resiliently mounted upon the driving axle.
Figure 3:
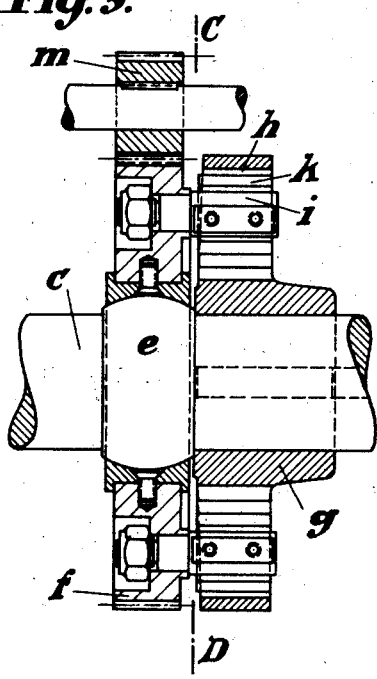
Fig. 3 is a vertical section showing the arrangement of the gear-wheel on the driving axle.
Figure 4:
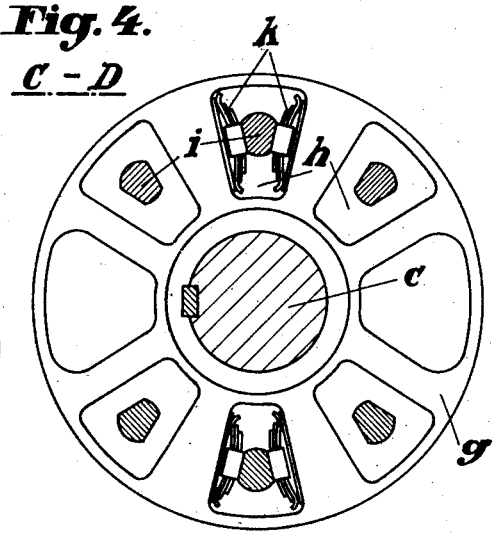
Fig. 4 is a section taken on the line C—D of Fig. 3.

The power to be conveyed to the gear wheel $f$ through the gearing is transmitted by said gear-wheel $f$ through the resiliently connected pins or bolts $i$ and springs $k$ to the disk $g$ and from the latter to the driving axle $c$. By reason of the vibrations occurring during the travel of the vehicle over the rail joints, and on account of the resilient suspension of the gear box $a$ relatively to the driving axle, as shown in Fig. 2, it may happen that the latter will temporarily be placed obliquely to the intermediate or jack shaft $l$. This would cause an improper onesided mesh between the gears $f$ and $m$. By making the seats of the gear wheel $f$ in the form of spherical surfaces corresponding to the spherical conformation of the ball journal, the driving axle may easily adjust itself within the hub of the gear wheel, so that the proper condition of mesh between the two gears will in no way be unfavorably affected. Due to the resilient connection of the coupling members $i$ the transmission of the power to the driving axle will be accomplished in such a manner, that no shocks or vibrations will occur. The gearing therefore operates completely quiet and any improper strain upon the faces of the teeth is positively avoided.

I claim:

1. In combination with a rail vehicle operated by a combustion motor, a driving axle carrying a ball journal, a gear-wheel mounted loosely upon said ball journal, resilient means for coupling said gear-wheel to said driving axle, said resilient means comprising a disk, which is rigidly mounted upon said driving axle, driving pins mounted on said gear-wheel, said driving pins projecting into recesses in said disk, and springs interposed between said pins and the walls of said recesses of said disk.

2. In a rail vehicle operated by a combustion motor, a driving axle, a gear member held concentric with said axle at all times and supported thereon to permit relative tilting of the axes of the axle and the gear member, a disk member on said driving axle, driving pins supported in one of said members and having a yielding connection to the other said member, and means for driving said gear member.

3. A driving connection for combustion motor operated rail vehicles comprising a driving axle, a gear member maintained in concentric relation with said axle and supported thereon for rocking movements in relation to the axle axis, a frame resiliently supported on said axle, a motor driven shaft mounted in said frame, a gear on said shaft in driving engagement with said gear member, a disk member fixed on said driving axle, and driving means fixed to one of said members and having a yielding connection with the other of said members.

4. In a motor driven rail vehicle, a frame, a driving axle resiliently mounted in said frame, a ball journal on said axle, a gear-wheel movably mounted on said ball journal, a member fast on said axle, a resilient driving connection between said member and said gear, and means in said frame for driving said gear.

5. In a motor driven rail vehicle, a frame, a driving axle resiliently mounted thereon, a motor driven shaft journaled in said frame, a driving gear upon said shaft, a ball journal on said driving axle, a gear-wheel mounted for universal tilting movement on said ball journal and operating said driving gear, a member fastened to said motor driven shaft, and a resilient connection between said member and said gear-wheel.

In testimony whereof I have affixed my signature.

JOSEF GEIGER.